United States Patent
Strock et al.

(10) Patent No.: US 8,727,712 B2
(45) Date of Patent: May 20, 2014

(54) ABRADABLE COATING WITH SAFETY FUSE

(75) Inventors: Christopher W. Strock, Kennebunk, ME (US); Matthew E. Bintz, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 660 days.

(21) Appl. No.: 12/881,313

(22) Filed: Sep. 14, 2010

(65) Prior Publication Data

US 2012/0063888 A1    Mar. 15, 2012

(51) Int. Cl.
*F01D 5/20* (2006.01)
*F01D 11/08* (2006.01)

(52) U.S. Cl.
USPC .................. 415/173.4; 415/174.4; 416/241 B

(58) Field of Classification Search
USPC .......................... 415/173.4, 174.4; 416/241 B
See application file for complete search history.

(56) References Cited

U.S. PATENT DOCUMENTS

| | | | |
|---|---|---|---|
| 3,820,673 A | 6/1974 | McVaugh | |
| 4,238,170 A | 12/1980 | Robideau et al. | |
| 4,588,607 A | 5/1986 | Matarese et al. | |
| 4,861,618 A | 8/1989 | Vine et al. | |
| 4,884,820 A | 12/1989 | Jackson et al. | |
| 5,113,582 A | 5/1992 | Monson et al. | |
| 5,434,210 A | 7/1995 | Rangaswamy et al. | |
| 5,562,404 A | 10/1996 | Koff et al. | |
| 5,705,231 A | 1/1998 | Nissley et al. | |
| 5,715,596 A | 2/1998 | Bintz | |
| 5,950,308 A | 9/1999 | Koff et al. | |
| 6,102,656 A * | 8/2000 | Nissley et al. | 415/174.4 |
| 6,358,002 B1 | 3/2002 | Good et al. | |
| 7,407,369 B2 | 8/2008 | Schwarz et al. | |
| 7,582,362 B2 * | 9/2009 | Fiala et al. | 428/674 |
| 2006/0140756 A1 | 6/2006 | Schwarz et al. | |
| 2008/0087023 A1 | 4/2008 | Suciu et al. | |
| 2008/0219835 A1 | 9/2008 | Freling et al. | |
| 2009/0136740 A1* | 5/2009 | Reynolds et al. | 428/325 |
| 2009/0148278 A1 | 6/2009 | Allen | |
| 2010/0098923 A1* | 4/2010 | Freling et al. | 428/215 |

FOREIGN PATENT DOCUMENTS

| | | |
|---|---|---|
| EP | 0765951 A2 | 4/1997 |
| EP | 0983421 B1 | 3/2000 |
| EP | 2050931 A2 | 4/2009 |
| GB | 2121884 A | 1/1984 |
| WO | WO2005071228 | 8/2005 |

OTHER PUBLICATIONS

Article entitled "On the Potential of Metal and Ceramic Based Abradables in Turbine Seal Applications", Proceedings of the Thirty-Sixth Turbomachinery Symposium—2007, Dieter Sporer et al., pp. 79-86.

(Continued)

*Primary Examiner* — Edward Look
*Assistant Examiner* — Christopher J Hargitt
(74) *Attorney, Agent, or Firm* — Kinney & Lange, P.A.

(57) ABSTRACT

An abradable coating for interaction with tips of airfoils (such as vanes or blades of a compressor of a gas turbine engine) includes a metal bond coat thermal, a ceramic layer, and an abradable layer. The ceramic layer on the metal bond coat provides insulation and acts as a fuse that is adapted to spall off upon high rub interaction. The abradable coating on the ceramic layer contacts the tips of the airfoils during operation of the compressor. The abradable coating is sufficiently abradable to roundup the coating by contact with the airfoil tips.

18 Claims, 3 Drawing Sheets

(56) References Cited

OTHER PUBLICATIONS

Article entitled "Increased Efficiency of Gas Turbines", New High-Termperature Seal System, Sulzer Technical Review Feb. 2008, Dieter Sporer et al., pp. 1-4.

European Search Report, mailed Nov. 17, 2011.
The Nov. 28, 2012 communication from the EPO for Application No. 11180991.9.

* cited by examiner

ABRADABLE COATING WITH SAFETY FUSE

BACKGROUND

Gas turbine engines include compressor rotors including a plurality of rotating compressor blades. Minimizing the leakage of air, such as between tips of rotating blades and a casing of the gas turbine engine, increases the efficiency of the gas turbine engine because the leakage of air over the tips of the blades can cause aerodynamic efficiency losses. To minimize this, the gap at tips of the blades is set small and at certain conditions, the blade tips may rub against and engage an abradable seal at the casing of the gas turbine. The abradability of the seal material prevents damage to the blades while the seal material itself wears to generate an optimized mating surface and thus reduce the leakage of air.

Abradable seals have also been used in turbines to reduce the gap between a rotor and a vane. Thermally sprayed abradable seals have been used in gas turbine engines since the late 1960s. The seals have been made as coatings from composite materials that derive their abradability from the use of low shear strength materials or from a porous, friable coating.

Cantilevered vane rotor coatings have, nevertheless, room for improvement. The coating should not be too thermally conductive, such as an alumina coating. This could cause thermal expansion induced runaway events. Use of a more insulative coating such as zirconia could spall during deep or high rate rub interactions with the vanes. Both situations can result in having to establish more open clearances between the rotor shaft and the vane tips.

In the past, cantilevered vane rubs are typically limited to less than 2 mils (50.4 microns) and have less than full circumference contact due to the risks of high rub forces, coating spallation or a thermal runaway event where the heat from the rub causes thermal expansion of the rotor. The rotor, when heated sufficiently, can grow out to interfere with the vanes. The result can be a burn through of holes in the rotating shaft, which can cause subsequent unscheduled engine removal.

SUMMARY

The present invention comprises a multi-layer coating system for use on components that are adjacent the tips of with airfoils of gas turbine engines. The multi-layer coating is formed from a metallic bond coat, a ceramic coating that provides thermal insulation and acts as a fuse portion of the coating system, and an abradable layer that has a designed wear ratio with the airfoil. The coating is adapted to prevent damage to the surface of a gas engine component facing the airfoil in the event of a high rub interaction. A high rub interaction is defined as any event in the operation of the turbine rotor and vane assembly that produces increased deleterious contact between the rotating and stationary components that would otherwise cause unwanted damage to the assembly.

DETAILED DESCRIPTION

Figure 1:
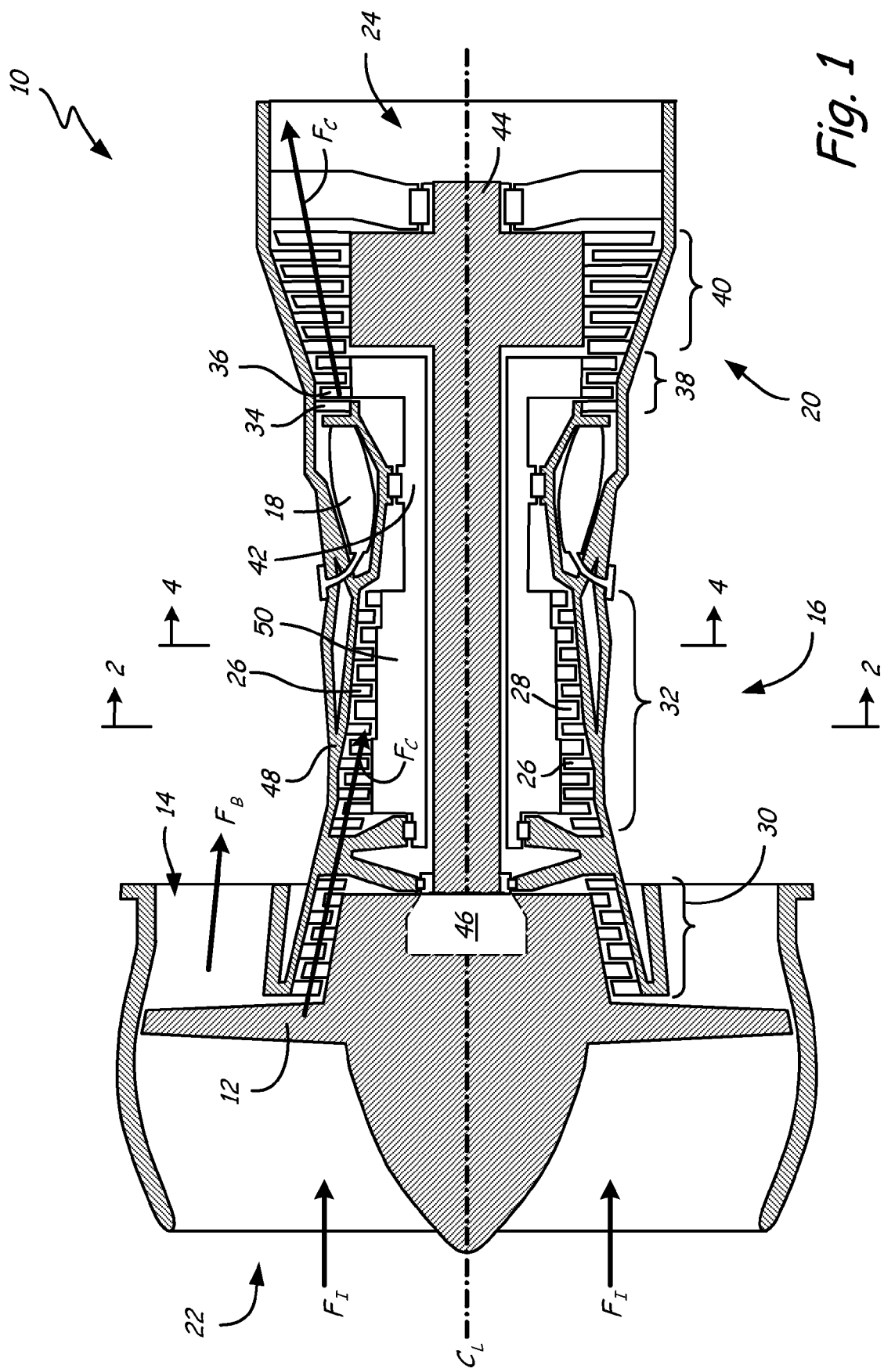
FIG. 1 illustrates a simplified cross-sectional view of a gas turbine engine.

FIG. 1 is a cross-sectional view of gas turbine engine 10, in a turbofan embodiment. As shown in FIG. 1, turbine engine 10 comprises fan 12 positioned in bypass duct 14, with bypass duct 14 oriented about a turbine core comprising compressor (compressor section) 16, combustor (or combustors) 18 and turbine (turbine section) 20, arranged in flow series with upstream inlet 22 and downstream exhaust 24.

Compressor 16 comprises stages of compressor vanes 26 and blades 28 arranged in low pressure compressor (LPC) section 30 and high pressure compressor (LPC) section 32. Turbine 20 comprises stages of turbine vanes 34 and turbine blades 36 arranged in high pressure turbine (HPT) section 38 and low pressure turbine (LPT) section 40. HPT section 38 is coupled to HPC section 32 via HPT shaft 32, forming the high pressure spool or high spool. LPT section 40 is coupled to LPC section 30 and fan 12 via LPT shaft 44, forming the low pressure spool or low spool. HPT shaft 42 and LPT shaft 44 are typically coaxially mounted, with the high and low spools independently rotating about turbine axis (centerline) $C_L$.

Fan 12 comprises a number of fan airfoils circumferentially arranged around a fan disk or other rotating member, which is coupled (directly or indirectly) to LPC section 30 and driven by LPT shaft 44. In some embodiments, fan 12 is coupled to the fan spool via geared fan drive mechanism 46, providing independent fan speed control.

As shown in FIG. 1, fan 12 is forward-mounted and provides thrust by accelerating flow downstream through bypass duct 14, for example in a high-bypass configuration suitable for commercial and regional jet aircraft operations. Alternatively, fan 12 is an unducted fan or propeller assembly, in either a forward or aft-mounted configuration. In these various embodiments turbine engine 10 comprises any of a high-bypass turbofan, a low-bypass turbofan or a turboprop engine, and the number of spools and the shaft configurations may vary.

In operation of turbine engine 10, incoming airflow $F_I$ enters inlet 22 and divides into core flow $F_C$ and bypass flow $F_B$, downstream of fan 12. Core flow $F_C$ propagates along the core flowpath through compressor section 16, combustor 18 and turbine section 20, and bypass flow $F_B$ propagates along the bypass flowpath through bypass duct 14.

LPC section 30 and HPC section 32 of compressor 16 are utilized to compress incoming air for combustor 18, where fuel is introduced, mixed with air and ignited to produce hot combustion gas. Depending on embodiment, fan 12 also provides some degree of compression (or pre-compression) to core flow $F_C$, and LPC section 30 may be omitted. Alternatively, an additional intermediate spool is included, for example in a three-spool turboprop or turbofan configuration.

Combustion gas exits combustor 18 and enters HPT section 38 of turbine 20, encountering turbine vanes 34 and turbine blades 36. Turbine vanes 34 turn and accelerate the flow, and turbine blades 36 generate lift for conversion to rotational energy via HPT shaft 42, driving HPC section 32 of compressor 16 via HPT shaft 42. Partially expanded combustion gas transitions from HPT section 38 to LPT section 40, driving LPC section 30 and fan 12 via LPT shaft 44. Exhaust flow exits LPT section 40 and turbine engine 10 via exhaust nozzle 24.

The thermodynamic efficiency of turbine engine 10 is tied to the overall pressure ratio, as defined between the delivery pressure at inlet 22 and the compressed air pressure entering combustor 18 from compressor section 16. In general, a higher pressure ratio offers increased efficiency and improved performance, including greater specific thrust. High pressure ratios also result in increased peak gas path temperatures, higher core pressure and greater flow rates, increasing thermal and mechanical stress on engine components.

Figure 2:
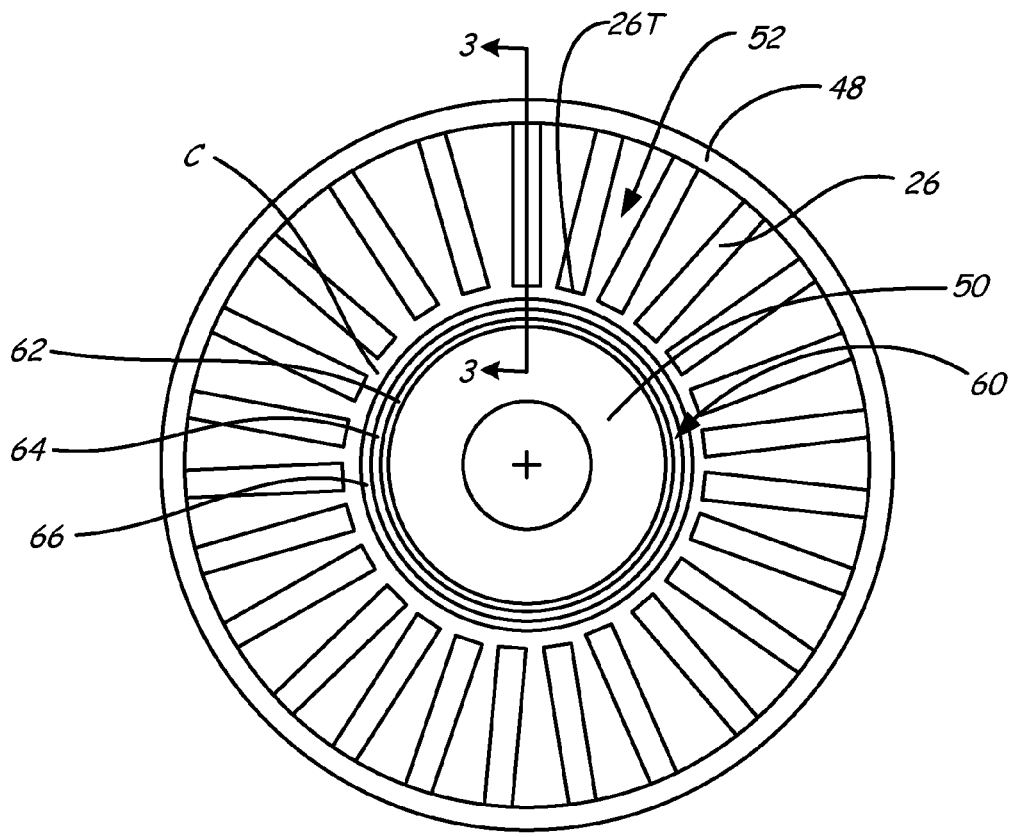
FIG. 2 illustrates a simplified cross sectional view illustrating the relationship of the rotor and vanes taken along the line 2-2 of FIG. 1, not to scale.
Figure 3:
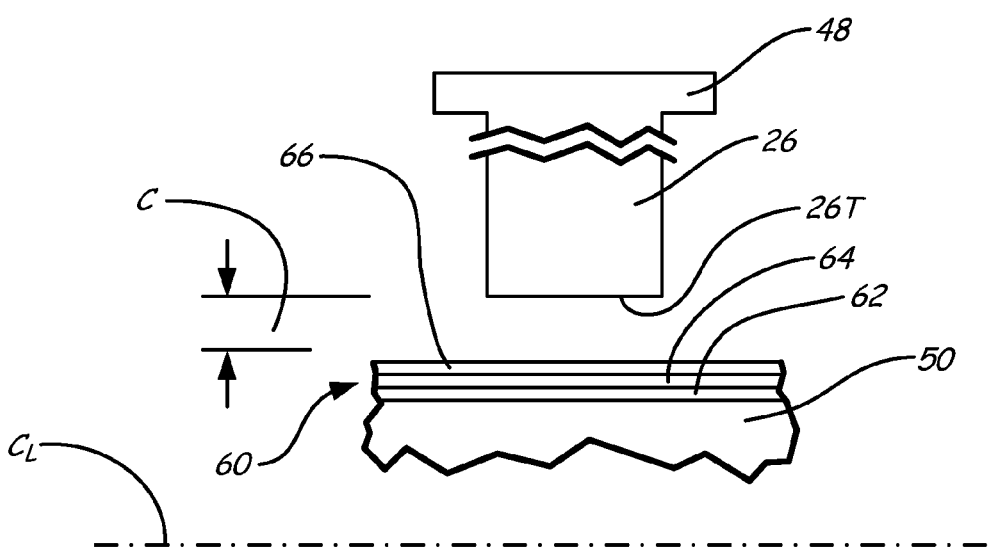
FIG. 3 is a cross sectional view taken along the line 3-3 of FIG. 2, not to scale.
Figure 4:
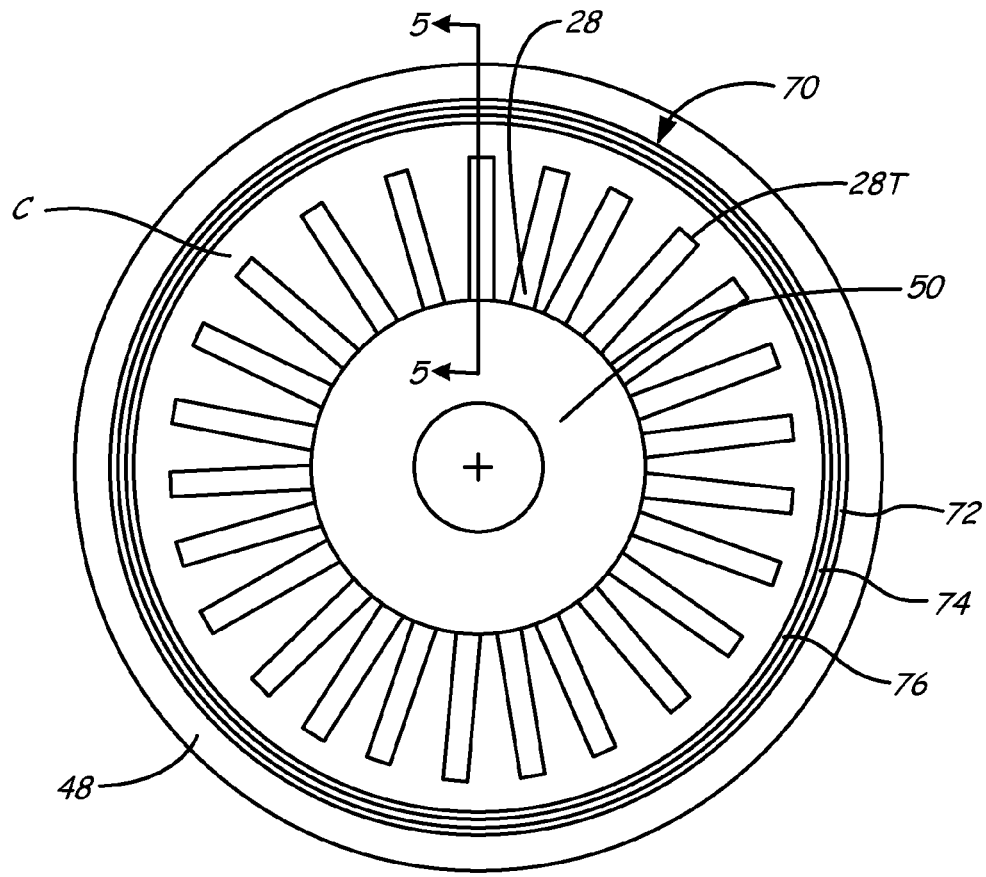
FIG. 4 illustrates a simplified cross sectional view illustrating the relationship of the casing or shroud and blades taken along the line 4-4 of FIG. 1, not to scale.
Figure 5:
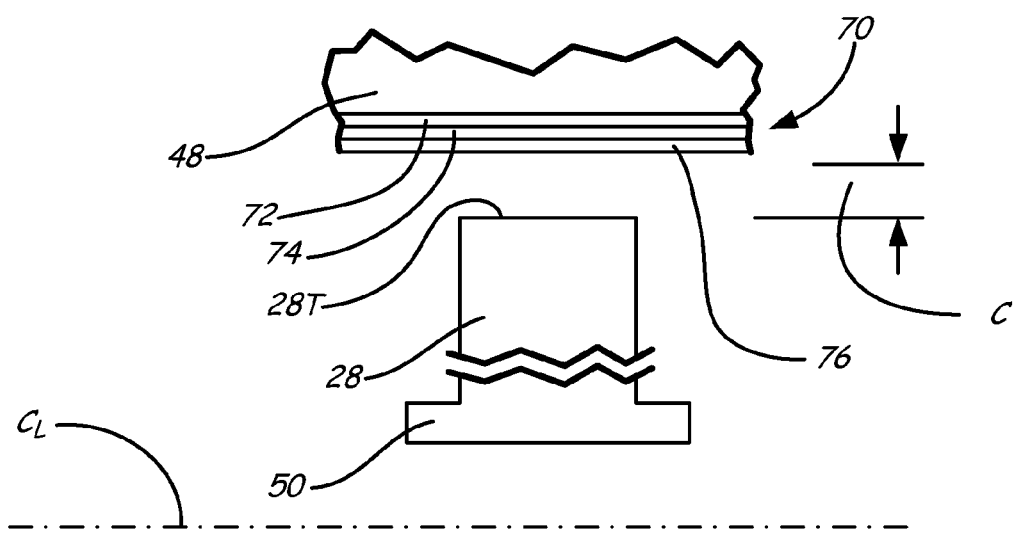
FIG. 5 is a cross sectional view taken along the line 5-5 of FIG. 4, not to scale.

The present invention is intended to be used with airfoils in turbine engines. The term "airfoil" is intended to cover both rotor blades and stator vanes. FIG. 2 and FIG. 3 disclose the invention with respect to interaction of a stator vane with a rotor. FIG. 4 and FIG. 5 disclose the invention with respect to interaction of a rotor blade with a stator casing or shroud. The coating of this invention may be used with either or both configurations.

FIG. 2 is a cross section along line 22 of FIG. 1 of a casing 48 which has a rotor shaft 50 inside. Vanes 26 are attached to casing 48 and the gas path 52 is shown as the space between vanes 26. Coating 60, corresponding to the coating of this invention, is on rotor shaft 50 such that the clearance C between coating 60 and vane tips 26T of vanes 26 has the proper tolerance for operation of the engine, e.g., to serve as a seal to prevent leakage of air (thus reducing efficiency), while not interfering with relative movement of the vanes and rotor shaft. In FIGS. 2 and 3, clearance C is expanded for purposes of illustration. In practice, clearance C may be, for example, in a range of about 0.025 inch to 0.055 inch when the engine is cold and 0.000 to 0.035 during engine operation depending on the specific operating condition and previous rub events that may have occurred.

FIG. 3 shows the cross section along line 3-3 of FIG. 2, with casing 48 and vane 26. Coating 60 is attached to rotor shaft 50, with a clearance C between coating 60 and vane tip 26T of vane 26 that varies with operating conditions, as described herein.

FIG. 2 and FIG. 3 show the tri-layer coating 60 in which includes metallic bond coat 62, ceramic coating 64, and abradable layer 66. Metallic bond coat 62 is applied to rotor shaft 50. Ceramic coating 64 is deposited on top of bond coat 62 and provides thermal insulation while also acting as a fuse portion of the system. Abradable layer 66 is deposited on top of ceramic coating 64 and is the layer that first encounters vane tip 26T.

As can be seen from FIG. 4 and FIG. 5, the same concept is used in which coating 70 is provided on the inner diameter surface of casing or shroud 48. Coating 70 includes a first metallic bond coat 72 that has been applied to the ID of stator casing 48. In other embodiments, stator casing 48 includes a shroud that forms a blade air seal. Ceramic coating 74 is formed on bond coat 72 and provides the same thermal insulation and fuse function as ceramic coating 64. Abradable layer 76 is formed on ceramic coating 74 and is the layer that first encounters rotor tip 28T.

Bond coats 68 and 78 are thin, up to 10 mils, more specifically ranging from about 3 mils to about 7 mils (76 to 178 microns). In the illustrated embodiment, ceramic coatings 64 and 74 are about twice as thick as bond coats 62 and 72, ranging from about 7 mils to about 12 mils (178 to 305 microns). Abradable coatings 66 and 76 are about the same thickness as bond coats 64 and 72, again ranging from about 3 mils to about 7 mils (76 to 178 microns).

Bond coats 62 and 72 may be formed of MCrAlY, the metal (M) can be nickel, iron, or cobalt, or combinations thereof and the alloying elements are chromium (Cr), aluminum (Al) and yttrium (Y). For example, bond coats 62 and 64 may be 15-40% Cr 6-15% Al, 0.61 to 1.0%. Y and the balance is cobalt, nickel or iron and combinations thereof.

Ceramic layer 64 and 74 may be any of the zirconia based ceramics such as are described in commonly owned U.S. Pat. Nos. 4,861,618, 5,879,573, 6,102,656 and 6,358,002 which are incorporated by reference herein in its entirety. Zirconia stabilized with 6-8% yttria is one example of such a ceramic layer 64 and 74. Other examples are zirconia stabilized with ceria, magnesia, calica and mixtures thereof.

Abradable layer 66 and 76 may be a porous or filled metallic or ceramic material such as SM2042, SM2043, Metco 105NS or Durabrade 2192 available from Sulzer Metco. SM2042 is described in U.S. Pat. No. 5,434,210, which is incorporated by reference herein in its entirety. The selection of suitable abradable layer material varies with application and is typically a compromise between erosion resistance, wear ratio with vane or blade tips and durability in the subject environment. One example choice may be Metco 105NS aluminum oxide coating with a mechanically roughened surface in an application where low erosion rate of the coating is desired.

Ceramic layer 64 and 74 serves a dual function in they provide both (1) the insulation to prevent the initiation of a thermal expansion induced runway interaction caused by local rub and local thermal expansion of the shaft or casing and (2) acts as a fuse, spalling off in circumstances of an unexpectedly high rub interaction. Turbines incur significant changes in operation when rapid changes in operation occur, such as when a bird impacts the turbine, during a hard landing, and when there are sudden compressor surges or stalls during engine operation. In these situations where an unexpectedly high rub interaction event occurs, or when interference of the rotor shaft 50 and vane tips 26T (or casing 48 and blade tip 28T) is larger than anticipated, ceramic layer 64 or 74 is designed to spall off and open the gap between the rotor shaft 50 and vane tips 26T (or casing 48 and blade tip 28T). Spalling occurs when the stresses in the ceramic fuse layer reach the ultimate strength of that layer. This happens when thermally induced stresses and rub forces are high during a rub interaction. The stresses are additive. During a rub interaction high contact forces contribute mechanically to stress while the sliding contact causes frictional heating that induces high thermal gradients and stresses due to differential thermal expansion. This prevents catastrophic damage to the rotating shaft 50 or casing 48. This spalling of ceramic layer 64 in these circumstances is designed to act as a circuit breaker or fuse to de-couple the surface of rotor shaft 50, including both the ceramic layer 64 and abradable layer 66, from interaction with vane tips 26T or blade tips. Similarly, spalling of ceramic layer 74 de-couples the inner surface of casing 48, including ceramic layer 74 and abradable layer 76, from blade tips 28T. A high rub interaction is defined herein as any event in the operation of the turbine rotor and vane assembly that produces increased deleterious contact between coating 60 and the vane tips 26T or coating 70 and blade tips 28T. This may occur when vane or blade material transfers to the abradable surface, during high rub interaction events or when the abradable layer is worn through.

The present invention successfully provides passive protection against catastrophic thermal runaway events that may cause burn through of the rotor shaft or casing. The invention prevents this by reducing heat transfer by using an abradable surface coating in combination with thermal insulating layer of ceramic, plus using the ceramic layer as a fuse that will spall and open up the gap rotating and stationary parts when an unexpectedly hard rub is encountered. A typical soft abradable layer or surface coating has a hardness on the Rockwell scale HR15Y of 80 or lower. These soft abradable layers also have a low tensile strength, such as 2000 psi or lower. Ceramic top layers may also be used that tend to be more wear resistant or abrasive than abradable. These may have strengths and hardness in the range of 1000-5000 psi and hardness in the vicinity of 70 HR10C. The high thermal gradient and stresses caused by the vane tips rubbing on the coating surface causes the spallation and this opens the tip gap to prevent further contact. The ceramic strength, as noted above, is controlled by adjusting its composition, porosity and thermal spray processing variables that influence residual stress level, strength and ability to withstand thermal gradients. The strength and resistance to thermal gradients have been selected to both retain the abradable layer during normal operation and to fail prior to vane damage.

The present invention is an improvement on prior systems because of its ability to provide an abradable layer for improved efficiency while also protecting the shaft from the heat of rub and the potential of catastrophic thermal runaways. Abradable layers 66 or 76 allows vane tips 26T or blade tips 28T to slide over the surface of abradable layers 66 or 76 such that vane tips 26T and blade tip 28T strikes coating particles that are protruding from the surface of the coating. The force of impact drives the individual particle into the coating. The stored elastic energy causes the particle to rebound and de-bond. This assists in roundup of the coatings 60 and 70 so that the clearance gap C is constant.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An abradable coating for use on a surface of a gas turbine engine component facing an airfoil, the coating comprising:
a metal bond coat on the surface facing an airfoil;
a ceramic fuse layer with a thickness of about 7 mils to about 12 mils (about 178 microns to about 305 microns) on the metal bond coat providing thermal insulation of the surface and being adapted to spall off upon high rub interaction; and
an abradable coating on the ceramic layer with a thickness of about 3 mils to about 7 mils (about 76 microns to about 178 microns) for contact with the airfoil during operation of the engine, the abradable coating being sufficiently abradable to roundup the coating by contact with the airfoil.

2. The coating of claim 1 wherein the component a rotor shaft and the airfoil is a stator vane.

3. The coating of claim 1 wherein the component is a casing with or without a shroud and the airfoil is a blade.

4. The coating of claim 1, wherein the metal bond coat has a thickness of about 1 mils to about 7 mils (about 76.2 to about 177.8 microns).

5. The coating of claim 1, wherein the metal bond coat is formed of MCrAlY, where M is nickel or cobalt or iron and combinations thereof.

6. The coating of claim 5, wherein the metal bond coat is formed of approximately 15-40% Cr, 6-15% Al, 0.61-1.0% Y, and a balance is selected from the group consisting of cobalt, nickel, iron and combinations thereof.

7. The coating of claim 1, wherein the ceramic fuse layer is selected from the group consisting of a zirconia based ceramic.

8. The coating of claim 1, wherein the abradable coating is filled metallic, alumina or zirconia based material having a Rockwell scale HR15Y hardness of 80 or lower.

9. An abradable coating for use on a surface of a gas turbine engine component facing an airfoil, the coating comprising:
a metal bond coat on the surface facing the airfoil and having a thickness of about 3 mils to about 7 mils (about 76 to about 178 microns);
a ceramic fuse layer on the metal bond coat having a thickness of (about 7 mils to about 12 mils (about 178 microns to about 305 microns); and
an abradable coating on the ceramic fuse layer for contact with the airfoil during operation of the engine, the abradable coating having a thickness of about 3 mils to about 7 mils (about 76 microns to about 178 microns) and adapted to spall off upon a high rub interaction event.

10. The coating of claim 9, wherein the abradable layer is sufficiently abradable to roundup the coating by contact with an airfoil.

11. The coating of claim 10, wherein the abradable coating is a filled metallic, alumina or zirconia based material having a Rockwell scale HR15Y hardness of 80 or lower.

12. The coating of claim 9, wherein the ceramic fuse layer is adapted to provide thermal insulation of the rotor shaft and is adapted to spall off upon high rub interaction event.

13. The coating of claim 12, wherein the ceramic fuse layer is a zirconia based ceramic.

14. The coating of claim 9, wherein the metal bond coating is formed of MCrAlY, where M is nickel or cobalt or iron and combinations thereof.

15. A compressor for a gas turbine engine comprising:
a rotor;
a plurality of blades extending outward from the rotor and comprising one or more rows;
a plurality of cantilevered vanes and extending inward toward the rotor;
a coating on a portion of a surface facing tips of the vanes or the blades, the coating including a first metal bond coat on the surface, a thermal insulating ceramic fuse layer on at least a portion of the metal bond coat adapted to spall off upon a high rub interaction event; and an abradable layer on at least a portion of the ceramic layer with a thickness of less than or equal to the thickness of the ceramic fuse layer.

16. The compressor of claim 15, wherein the abradable layer contacts the vanes to roundup the coating.

17. The compressor of claim 15, wherein the abradable layer has a thickness of about 3 mils to about 7 mils (about 76.2 microns to about 177.8 microns).

18. The compressor of claim 15 wherein the thermal insulating ceramic fuse layer has a thickness of about 7 mils to about 12 mils (about 177.8 microns to about 304.8 microns.

\* \* \* \* \*